(12) United States Patent
Higgins et al.

(10) Patent No.: US 11,136,071 B2
(45) Date of Patent: Oct. 5, 2021

(54) VEHICULAR BODY STRUCTURAL ARRANGEMENTS

(71) Applicant: Toyota Motor Engineering & Manufacturing North America, Inc., Plano, TX (US)

(72) Inventors: Christopher M. Higgins, Ann Arbor, MI (US); Matthew A. Jansma, Saline, MI (US); Herbert Meingast, Ann Arbor, MI (US); Naoya Ashida, Miyoshi (JP)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 85 days.

(21) Appl. No.: 16/379,988

(22) Filed: Apr. 10, 2019

(65) Prior Publication Data
US 2020/0324832 A1 Oct. 15, 2020

(51) Int. Cl.
| | |
|---|---|
| *B62D 33/023* | (2006.01) |
| *B62D 33/077* | (2006.01) |
| *B62D 33/02* | (2006.01) |
| *B62D 25/08* | (2006.01) |
| *B62D 21/18* | (2006.01) |
| *B62D 29/00* | (2006.01) |

(52) U.S. Cl.
CPC .......... *B62D 33/023* (2013.01); *B62D 21/18* (2013.01); *B62D 25/08* (2013.01); *B62D 29/001* (2013.01); *B62D 33/02* (2013.01); *B62D 33/077* (2013.01)

(58) Field of Classification Search
CPC ...... B62D 25/02; B62D 25/087; B62D 25/20; B62D 25/2009; B62D 29/001; B62D 29/04; B62D 33/02; B62D 33/023; B62D 33/077

USPC ....................... 296/37.6, 181.2, 181.3, 183.1
See application file for complete search history.

(56) References Cited

U.S. PATENT DOCUMENTS

| | | | | |
|---|---|---|---|---|
| 4,382,626 | A * | 5/1983 | Spooner ................. | B62D 23/00 29/509 |
| 6,247,747 | B1 | 6/2001 | Kawanomoto et al. | |
| 6,422,642 | B1 * | 7/2002 | Grimm ................... | B60P 1/286 296/100.06 |
| 6,439,649 | B1 * | 8/2002 | Lorenzo ............... | B62D 29/043 296/181.3 |
| 6,814,397 | B2 * | 11/2004 | Henderson ............. | B62D 33/02 296/181.3 |

(Continued)

FOREIGN PATENT DOCUMENTS

FR          1603206 A *  3/1971    ........... B62D 29/045

OTHER PUBLICATIONS

Tubtara Blind Rivet Nuts as existed Mar. 12, 2018; retrieved via the Internet Archive WayBack Machine located at https://web.archive.org/web/20180312042848/https://www.tubtara.com/en/what-are-tubtara-blind-rivet-nuts. (Year: 2018).*

*Primary Examiner* — Jason S Daniels
(74) *Attorney, Agent, or Firm* — Christopher G. Darrow; Darrow Mustafa PC

(57) ABSTRACT

A vehicular body structural arrangement includes a unitarily-formed polymeric bed box including a bulkhead panel, an elongate reinforcement including a spine, and a row of rivet nuts securing the reinforcement to the bulkhead panel in an unconcealed manner. The reinforcement is backed against the bulkhead panel from outside the bed box. The rivet nuts are installed to the bulkhead panel against the reinforcement facing inside the bed box.

20 Claims, 6 Drawing Sheets

(56) References Cited

U.S. PATENT DOCUMENTS

| | | | | |
|---|---|---|---|---|
| 7,588,285 | B2* | 9/2009 | Mohammed | B62D 33/0273 296/183.1 |
| 8,371,785 | B2* | 2/2013 | Babej | B60R 9/06 411/180 |
| 2005/0225111 | A1* | 10/2005 | Boyer | B62D 65/02 296/37.6 |
| 2009/0115222 | A1* | 5/2009 | Hohnl | B60Q 3/30 296/183.1 |
| 2015/0360734 | A1* | 12/2015 | McKinney | B60R 9/02 296/180.1 |
| 2017/0349106 | A1* | 12/2017 | Zajicek | B60R 9/02 |
| 2018/0170295 | A1* | 6/2018 | Edwards | B60R 19/44 |
| 2018/0194405 | A1 | 7/2018 | Hatke | |
| 2018/0244321 | A1 | 8/2018 | McCloud | |
| 2020/0238889 | A1* | 7/2020 | Jansma | B60R 7/08 |

* cited by examiner

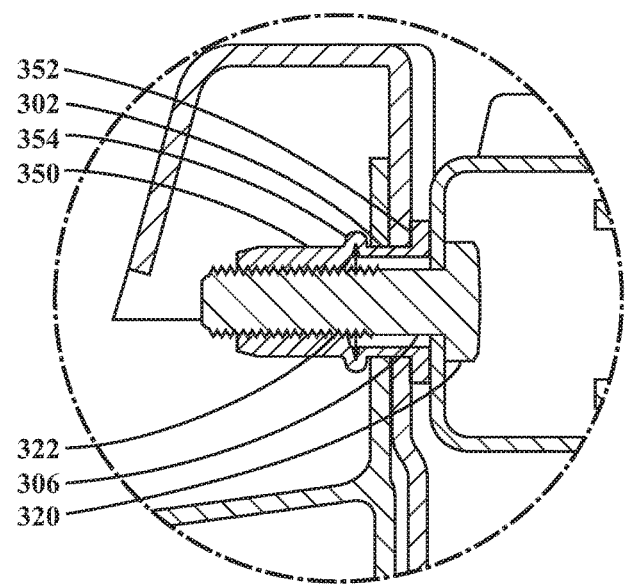
FIG. 3E
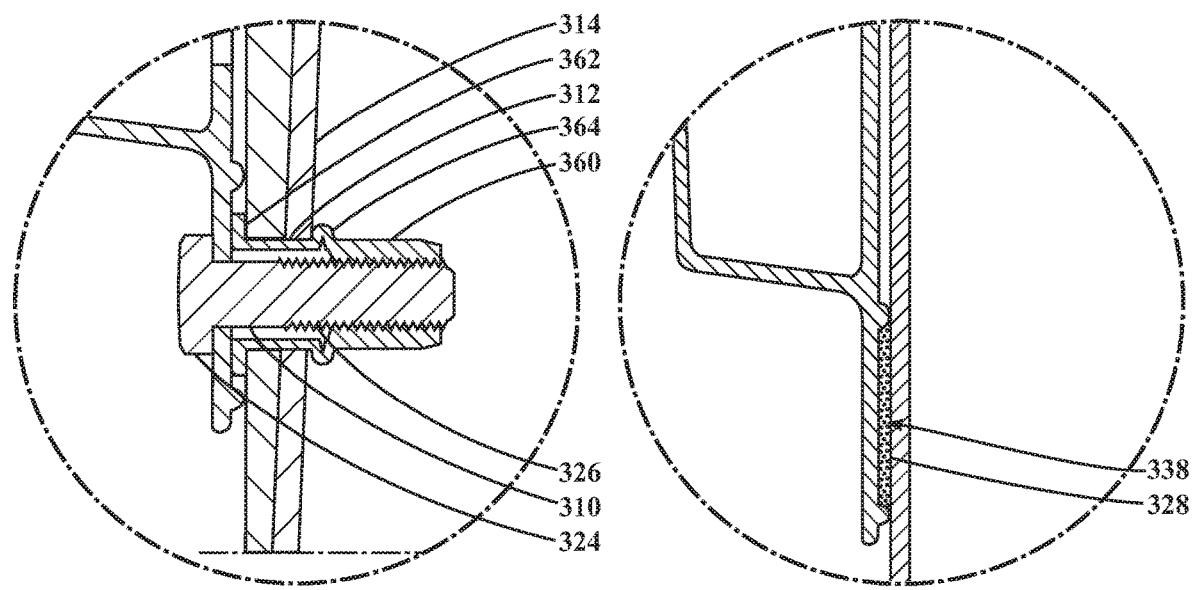
FIG. 3G
FIG. 3I

VEHICULAR BODY STRUCTURAL ARRANGEMENTS

TECHNICAL FIELD

The embodiments disclosed herein relate to the bodies of vehicles and, more particularly, to structural arrangements for the bodies of vehicles with beds.

BACKGROUND

The bodies of vehicles and, more particularly, the structural arrangements for the bodies of vehicles with beds, have long been a focus of automotive design. Some of these structural arrangements involve bodies that, in association with the beds, include polymeric body elements or other alternatives to traditional metallic body elements.

SUMMARY

Disclosed herein are embodiments of a structural arrangement for the body of a vehicle with a bed. In one aspect, a vehicular body structural arrangement includes a unitarily-formed polymeric bed box including a bulkhead panel, an elongate reinforcement including a spine, and a row of rivet nuts securing the reinforcement to the bulkhead panel in an unconcealed manner. The reinforcement is backed against the bulkhead panel from outside the bed box. The rivet nuts are installed to the bulkhead panel against the reinforcement facing inside the bed box.

In another aspect, a vehicular body structural arrangement includes a unitarily-formed polymeric bed box including a bulkhead panel and an outside bracket inline with the bulkhead panel, an elongate reinforcement including a spine, a rivet nut and a fastener securing the reinforcement to the bracket at an end thereof from outside the bed box, and adhesive securing the reinforcement to the bulkhead panel from outside the bed box. The rivet nut is installed to the bracket against a backing facing outside the bed box, and the fastener extends through the reinforcement to the rivet nut. The fastener is engaged with the reinforcement, and threaded with the rivet nut. The reinforcement includes a channel facing the bulkhead panel, and the adhesive is bonded between the reinforcement and the bulkhead panel inside the channel.

In yet another aspect, a vehicular body structural arrangement includes a unitarily-formed polymeric bed box including a deck panel, side panels, a bulkhead panel and outside brackets inline with the bulkhead panel, an elongate metallic reinforcement having an extruded construction and including a spine, and an upper edge and a lower edge opposed about the spine, a row of first rivet nuts securing the reinforcement to the bulkhead panel along the upper edge, an accessory rail, first fasteners securing the accessory rail to the bulkhead panel using the first rivet nuts, second rivet nuts and second fasteners securing the reinforcement to the bracket at ends of the lower edge from outside the bed box, and adhesive securing the reinforcement to the bulkhead panel along the lower edge from outside the bed box. The reinforcement is backed against the bulkhead panel and the brackets from outside the bed box, with the upper edge and the lower edge engaged with the bulkhead panel. The first rivet nuts are installed to the bulkhead panel against the upper edge facing inside the bed box. The accessory rail is backed against the bulkhead panel from inside the bed box, and the first fasteners respectively extend through the accessory rail to the first rivet nuts. The first fasteners are engaged with the accessory rail, and threaded with the first rivet nuts. The second rivet nuts are installed to the brackets against backings facing outside the bed box, and the second fasteners respectively extend through the lower edge to the second rivet nuts. The second fasteners are engaged with the lower edge, and threaded with the second rivet nuts. The lower edge includes a channel facing the bulkhead panel, and the adhesive is bonded between the lower edge and the bulkhead panel inside the channel.

These and other aspects will be described in additional detail below.

BRIEF DESCRIPTION OF THE DRAWINGS

The various features, advantages and other uses of the present embodiments will become more apparent by referring to the following detailed description and drawing in which:

FIGS. 3D and 3E are cross sectional views of the structural arrangement of FIGS. 3A, 3B and 3C, showing rivet nuts securing the reinforcement to the bulkhead panel;

FIGS. 3F and 3G are cross sectional views of the structural arrangement of FIGS. 3A, 3B and 3C, showing fasteners securing the reinforcement to the bracket, and associated features of the bracket by which the fasteners secure the reinforcement to the bracket without tightening against the bracket; and FIGS. 3H and 3I are cross sectional views of the structural arrangement of FIGS. 3A, 3B and 3C, showing adhesive securing the reinforcement to the bulkhead panel.

DETAILED DESCRIPTION

This disclosure teaches a structural arrangement for realizing the benefits of a vehicle with a bed whose body includes associated polymeric body elements, including as part of a unitarily-formed polymeric bed box. Among other things, the vehicle enjoys improved mass compared to otherwise similar vehicles with traditional metallic body elements. Moreover, the polymeric body elements offer vehicle manufacturers opportunities for improved manufacturability, improved cost and the like.

In addition to the polymeric body elements, the body includes other body elements, including metallic body elements, for structural reinforcement and the like. As part of the body, a fastener-based structural arrangement is used to secure neighboring body elements, including metallic body elements, to one another without tightening the fasteners against the polymeric body elements. Moreover, the fasteners used to secure other body elements, including metallic body elements, to the polymeric body elements are disguised, concealed and/or avoided in favor of hidden alternatives. Although these and other teachings find application in the vehicle disclosed herein, it will be understood that this disclosure is applicable in principle to otherwise similar vehicles with any combination of polymeric body elements, other non-metallic and metallic alternatives to traditional metallic body elements, and traditional metallic body elements.

Figure 1A:
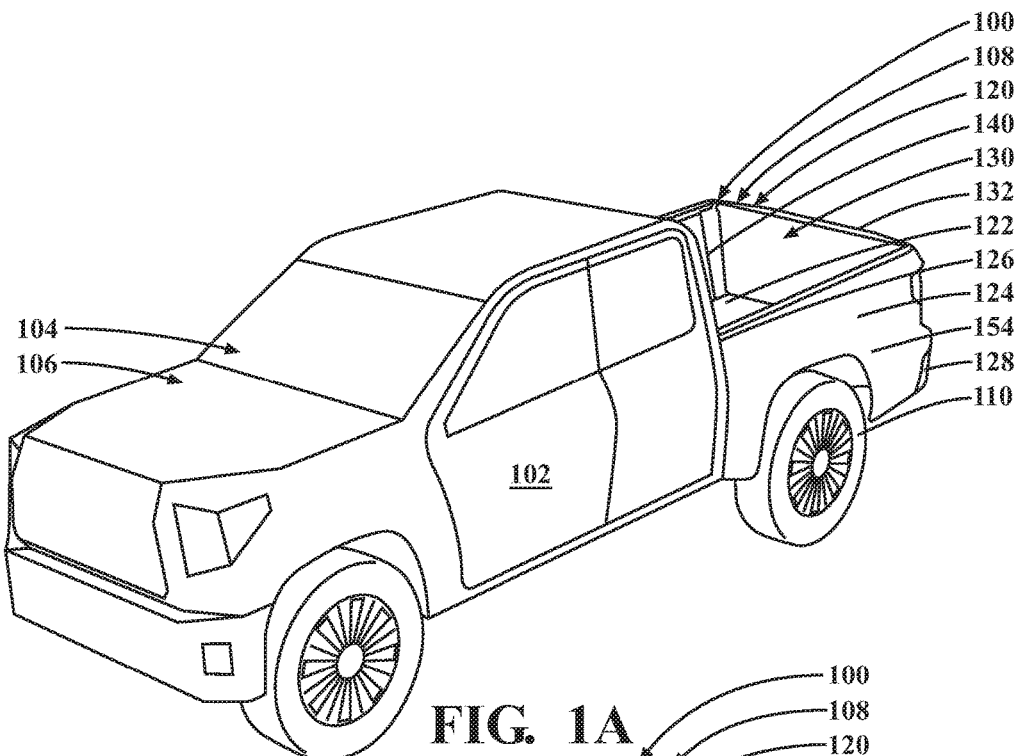
FIG. 1A is a perspective view of a vehicle with a bed whose body includes a polymeric bed box.
Figure 1B:
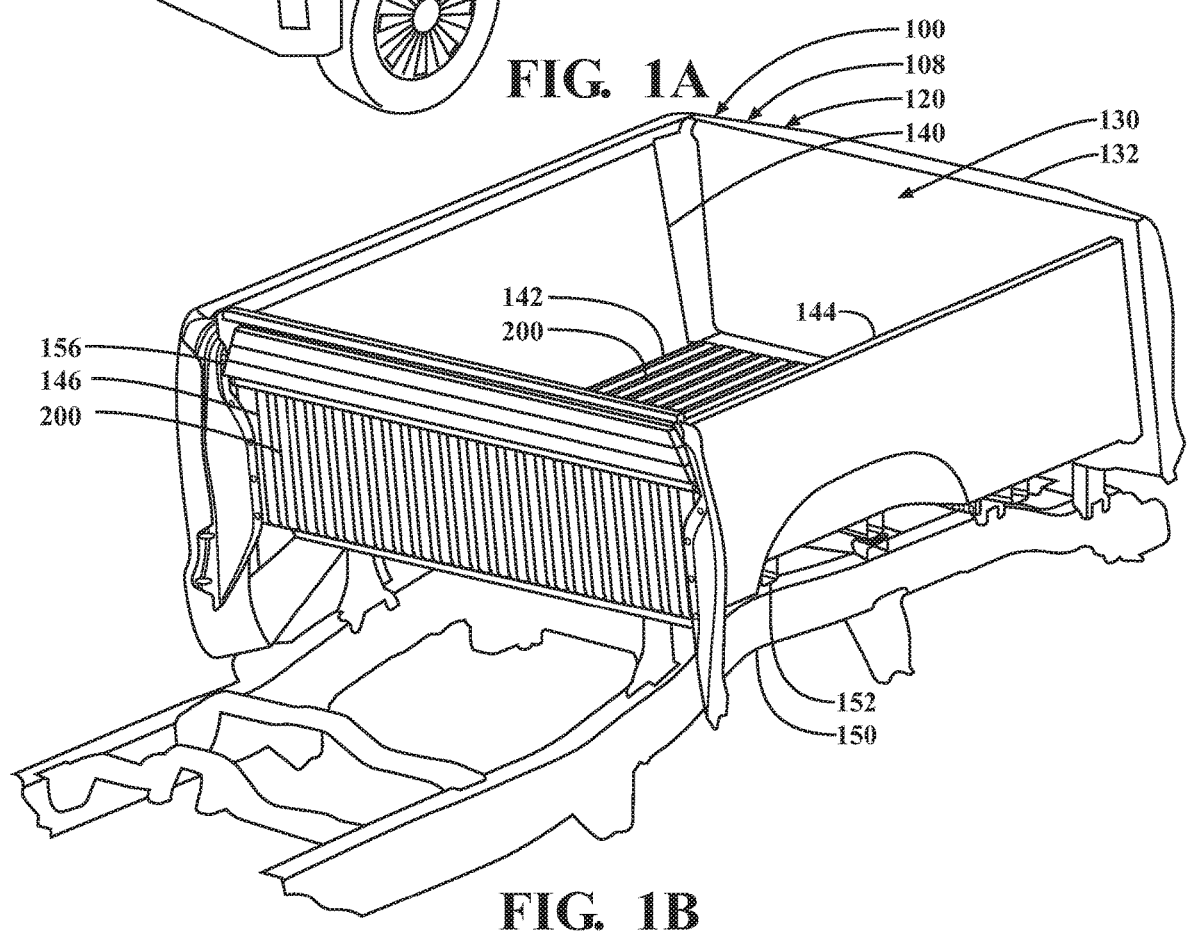
FIG. 1B is a perspective view of the body with a rear quarter panel removed for better viewing, showing frame rails, crossbeams resting atop the frame rails, a deck panel of the bed box resting atop the crossbeams, and a reinforcement backed against a bulkhead panel of the bed box.

A representative passenger vehicle 100 is shown in FIGS. 1A and 1B. In this description, uses of "front," "forward" and the like, and uses of "rear," "rearward" and the like, refer to the longitudinal directions of the vehicle 100. "Front," "forward" and the like refer to the front (fore) of the vehicle 100, while "rear," "rearward" and the like refer to the back (aft) of the vehicle 100. Uses of "side," "sideways," "transverse" and the like refer to the lateral directions of the vehicle 100, with "driver's side" and the like referring to the left side of the vehicle 100, and "passenger side" and the like referring to the right side of the vehicle 100.

As shown, the vehicle 100 is a pickup truck. The vehicle 100 includes an exterior 102 and a number of interior compartments. The compartments include a passenger compartment 104, an engine compartment 106 and, in the illustrated pickup truck configuration of the vehicle 100, an open-topped bed 108 for carrying cargo. Among other things, the vehicle 100 may include seats, a dash assembly, an instrument panel, controls and the like housed in the passenger compartment 104. Additionally, the vehicle 100 may include an engine, a motor, a transmission and the like, as well as other powertrain components, such as wheels 110, housed in the engine compartment 106 and elsewhere in the vehicle 100. The wheels 110 support the remainder of the vehicle 100 on the ground. One, some or all of the wheels 110 are powered by the remainder of the powertrain components to drive the vehicle 100 along the ground.

The vehicle 100 includes a body 120 that forms the exterior 102 and defines or otherwise encloses the bed 108 and other compartments. In relation to the bed 108, the body 120 includes a deck 122, two sides 124, a bulkhead 126 and a rear end 128. Additionally, in relation to the passenger compartment 104 and the engine compartment 106, the vehicle 100 may include a floor forward of the deck 122, a partition forward of the bulkhead 126, a front end, a roof, a hood and the like. At the rear end 128, the body 120 defines a tailgate opening 130. Similarly to other openings that open between the compartments and the exterior 102, the tailgate opening 130 opens between the bed 108 and the exterior 102. Relatedly, as part of the rear end 128, the body 120 includes a tailgate 132 corresponding to the tailgate opening 130. Similarly to other closure panels that correspond to other openings, the tailgate 132 is pivotally connected to the remainder of the body 120 for movement, relative to the tailgate opening 130, between a closed position over the tailgate opening 130, and an open position away from the tailgate opening 130.

The body 120 is constructed from any combination of rigidly interconnected frame members, panels and other body elements, as well as any combination of overlying paneling, trim, upholstery and other body coverings. In relation to the bed 108, the body 120 includes an open-topped bed box 140. Also referable to as an "inner," the bed box 140 is different from bed liners insofar as that while bed liners are essentially body coverings, the bed box 140 is a body element, and includes body sub-elements, indispensable to the construction of the body 120 itself. The bed box 140 includes a deck panel 142, two side panels 144 and a bulkhead panel 146. As part of the deck 122, the body 120 includes the deck panel 142 as an overlying body element, as well as two frame rails 150 and a number of crossbeams 152 as underlying body elements. Moreover, as part of the sides 124, the body 120 includes the side panels 144 as inner body elements, as well as two rear quarter panels 154 (one shown, with the other being a mirror image) as outer body elements. Moreover, as part of the bulkhead 126, the body 120 includes the bulkhead panel 146 as an inner body element, as well as an elongate reinforcement 156 as an outer body element. At the rear end 128, the body 120 defines the tailgate opening 130 in the space between side panels 144.

The deck 122 is horizontal, and extends longitudinally between the bulkhead 126 and the rear end 128, and laterally between the sides 124. At the deck 122, as part of the body 120, the frame rails 150, the crossbeams 152 and the deck panel 142 are secured to one another. Relatedly, the bed box 140 is secured at the deck panel 142 to the frame rails 150 via the crossbeams 152. As part of the deck 122, the frame rails 150, the crossbeams 152 and the deck panel 142 are horizontal, and vertically spaced apart from one another, with the crossbeams 152 overlying and resting atop the frame rails 150, and the deck panel 142, as well as the bed box 140 to which the deck panel 142 belongs, overlying and resting atop the crossbeams 152. The frame rails 150 are laterally spaced apart from one another, and extend longitudinally along the sides 124, from forward of the bulkhead 126, between the bulkhead 126 and the rear end 128. The crossbeams 152 are longitudinally spaced apart from one another between the bulkhead 126 and the rear end 128, and extend laterally between the frame rails 150 along the sides 124. The deck panel 142 extends longitudinally from the bulkhead 126, and laterally between the frame rails 150 along the sides 124.

The bulkhead 126 is upright, and extends vertically from the deck 122, and laterally between the sides 124. At the bulkhead 126, as part of the body 120, the bulkhead panel 146 and the reinforcement 156 are secured to one another. As part of the bulkhead 126, the bulkhead panel 146 and the reinforcement 156 are upright, and longitudinally spaced apart from one another, with the reinforcement 156 forward of and backed against the bulkhead panel 146. The bulkhead panel 146 extends vertically from the deck 122, and laterally between the frame rails 150 along the sides 124. The reinforcement 156 extends vertically from above the deck 122, and laterally between the frame rails 150 along the sides 124.

In relation to the bed box 140, the deck panel 142, as part of the bed box 140, extends longitudinally from the bulkhead panel 146, and laterally between the side panels 144. Moreover, the frame rails 150 extend longitudinally across the deck panel 142 alongside the lateral peripheries thereof. Moreover, the crossbeams 152 extend laterally across the deck panel 142 between the lateral peripheries thereof to end flush with the side panels 144. Relatedly, as part of the deck panel 142, the bed box 140 includes frame rail footprints and crossbeam footprints therefor respectively corresponding to the locations where the frame rails 150 and the crossbeams 152 extend or, in a preassembled state, will extend across the deck panel 142. As part of an integral unit with the bed box 140, the crossbeams 152 are directly secured thereto, including to the deck panel 142. Moreover, with the crossbeams 152 secured to the deck panel 142, the crossbeams 152 are secured to the frame rails 150.

The bulkhead panel 146, as part of the bed box 140, extends vertically from the deck panel 142, and laterally between the side panels 144. Moreover, the reinforcement 156 extends vertically from above the deck panel 142 across approximately the uppermost ⅓ of the bulkhead panel 146, laterally across the bulkhead panel 146 between the lateral peripheries thereof, and laterally past the bulkhead panel 146 to end laterally outside the junctions between the bulkhead panel 146 and the side panels 144. As part of an integral unit with the bed box 140, the reinforcement 156 is directly secured thereto, including to the bulkhead panel 146.

The bed box 140 has a molded or otherwise unitarily-formed construction. Moreover, the bed box 140 is made from one or more high-strength, durable and corrosion-resistant polymeric materials. For instance, the bed box 140 may be made from one or more fiber-reinforced thermosetting resins suitable for compression molding, such as sheet molding compound, including sheet molding compound featuring polyester and any combination of glass fibers (i.e., fiberglass), carbon fibers and the like. The body elements besides the bed box 140 may have molded constructions, and may be made from one or more polymeric materials suitable for molding, such as thermosetting resins, including fiber-reinforced thermosetting resins. Additionally, or alternatively, the body elements besides the bed box 140 may have any combination of fabricated, bent, stamped, extruded, casted and like constructions, and may be made from one or more metallic materials. For instance, the frame rails 150, the crossbeams 152 and the rear quarter panels 154 may be made from one or more metals, such as steel or aluminum. For instance, the reinforcement 156 has an extruded construction, and may be made from one or more metals suitable for extrusion, such as aluminum.

The body 120 imparts structure to the vehicle 100, including when the vehicle 100 experiences cargo loading or, in other words, locally normal loading on the vehicle 100 by cargo in the bed 108. The body 120, including the deck 122, the sides 124 and the bulkhead 126, plays a principal role in maintaining the bed 108 against cargo loading on behalf of the vehicle 100. Relatedly, each body element included as part of the deck 122, the sides 124 and the bulkhead 126 may play a role in strengthening the bed 108 against cargo loading.

Although the bed box 140 includes various surface geometries for increased rigidity, from the perspective of the body 120, the deck panel 142 and the bulkhead panel 146 alone, by design, have insufficient strengths against cargo loading. Rather than increasing the cross-sectional thicknesses of the deck panel 142 and the bulkhead panel 146 or otherwise introducing mass-related compromises for increased strength against cargo loading, the body 120 includes the crossbeams 152 and the reinforcement 156 for structural reinforcement. When the vehicle 100 experiences cargo loading at the deck 122, the crossbeams 152 structurally reinforce the body 120 against the deck panel 142 flexing toward the ground. Similarly, when the vehicle 100 experiences cargo loading at the bulkhead 126, the reinforcement 156 structurally reinforces the body 120 against the bulkhead panel 146 flexing toward the passenger compartment 104.

Figure 2A:
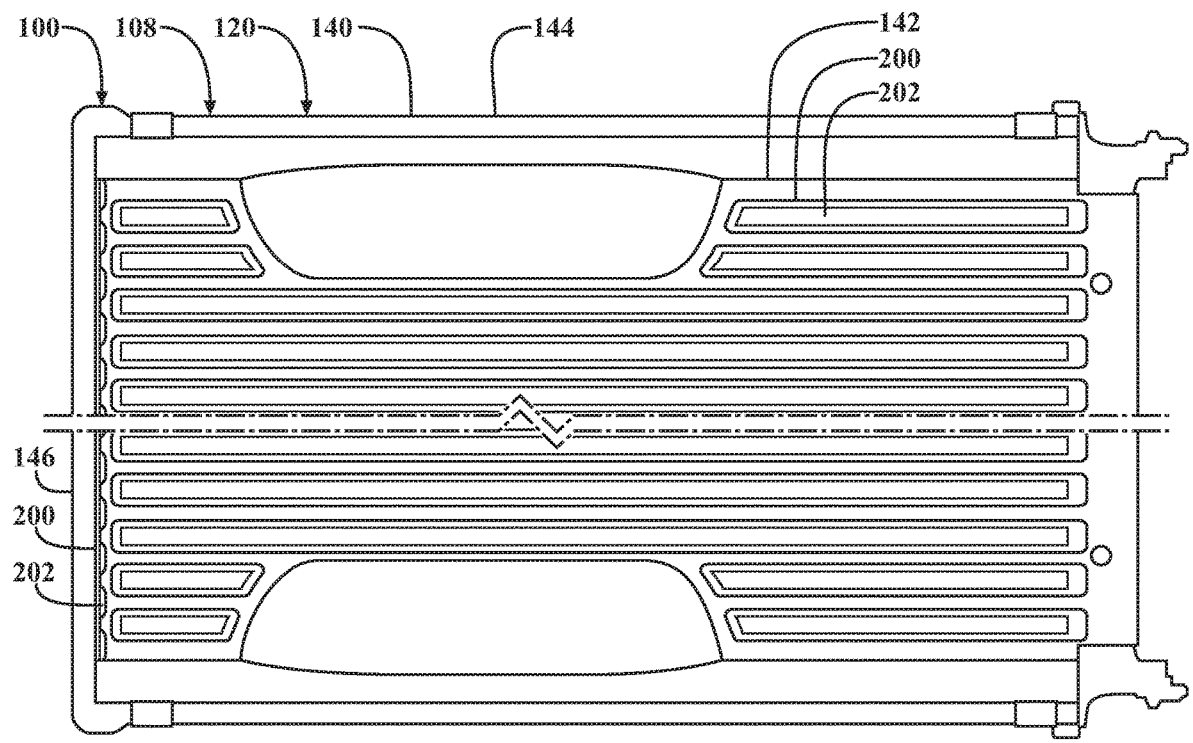
FIGS. 2A and 2B are top and bottom views, respectively, of a unit including the bed box, and the crossbeams and the reinforcement secured thereto, showing a corrugated section across the deck panel, and a corrugated section across the bulkhead panel.
Figure 2B:
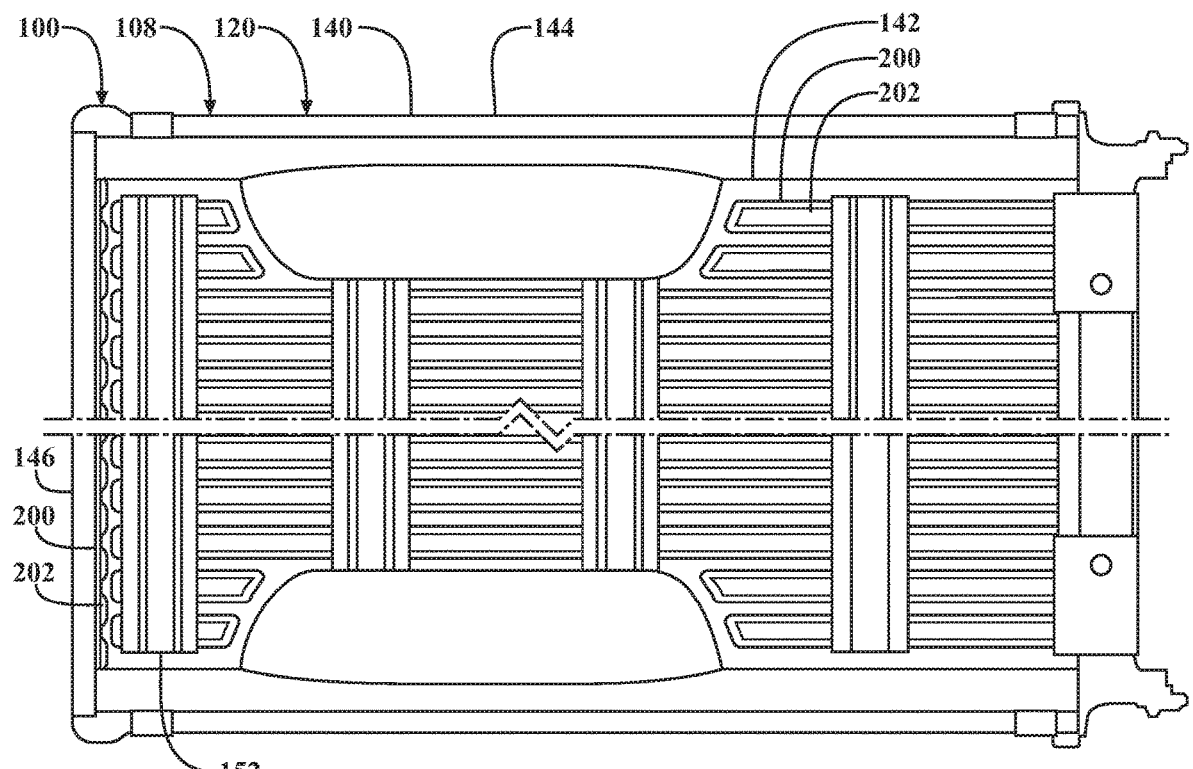

From its inner location enclosing the bed 108, the bed box 140 directly assumes cargo loading. As noted above, in order to strengthen the bed 108 against cargo loading, the bed box 140 includes various surface geometries for increased rigidity. For instance, as shown with additional reference to FIGS. 2A and 2B, the bed box 140 includes one or more corrugated sections 200. In the corrugated sections 200, the bed box 140 is rigidified or, in other words, has increased rigidity compared to otherwise similar bed boxes with non-corrugated sections.

In each corrugated section 200, the bed box 140 is corrugated or, in other words, repeatedly doubled over itself. The bed box 140 thereby includes a series of unitarily-formed corrugations 202 or, in other words, adjacent ridges and valleys. One, some or all of the corrugations 202 may have hollowed trapezoidal cross-sectional shapes. For instance, as shown, each corrugation 202 has a hollowed trapezoidal cross-sectional shape. With the corrugations 202 having hollowed trapezoidal cross-sectional shapes, the corrugations 202 generally simulate a trapezoidal wave, and the bed box 140 includes adjacent flat-topped ridges and flat-bottomed valleys.

The bed box 140 includes a corrugated section 200 across the deck panel 142. In the corrugated section 200, the deck panel 142 is corrugated to include corrugations 202 that, with the deck panel 142 being horizontal, are adjacent underside ridges/topside valleys and topside ridges/underside valleys. In other words, the corrugations 202 are adjacent underside ridges and underside valleys that correspond to adjacent topside valleys and topside ridges. As shown, the deck panel 142 is laterally corrugated, with the corrugations 202 extending longitudinally crosswise to the crossbeams 152. Moreover, the corrugated section 200 is implemented across substantially all of the deck panel 142. Relatedly, with the deck panel 142 resting atop the crossbeams 152, the crossbeams 152 engage with the underside ridges, leaving spaces between the crossbeams 152 and the adjacent underside valleys.

Similarly, the bed box 140 includes a corrugated section 200 across the bulkhead panel 146. In the corrugated section 200, the bulkhead panel 146 is corrugated to include corrugations 202 that, with the bulkhead panel 146 being upright, are adjacent outside ridges/inside valleys and inside ridges/outside valleys. In other words, the corrugations 202 are adjacent outside ridges and outside valleys that correspond to adjacent inside valleys and inside ridges. As shown, the bulkhead panel 146 is laterally corrugated, with the corrugations 202 extending vertically crosswise to the reinforcement 156. Moreover, the corrugated section 200 is implemented across substantially all of the bulkhead panel 146. Relatedly, with the reinforcement 156 backed against the bulkhead panel 146, the reinforcement 156 engages with the outside ridges, leaving spaces between the reinforcement 156 and the adjacent outside valleys.

As noted above, as part of an integral unit with the bed box 140, the reinforcement 156 is directly secured thereto, including to the bulkhead panel 146. Specifically, the reinforcement 156 is secured to the bed box 140, including the bulkhead panel 146, at securement points at the bulkhead 126. The securement points are laterally across the bulkhead panel 146 where, with the reinforcement 156 extending between the lateral peripheries thereof, the reinforcement 156 is backed against the bulkhead panel 146. Moreover, the securement points are laterally past the bulkhead panel 146, where the reinforcement 156 ends laterally outside the junctions between the bulkhead panel 146 and the side panels 144.

Figure 3A:
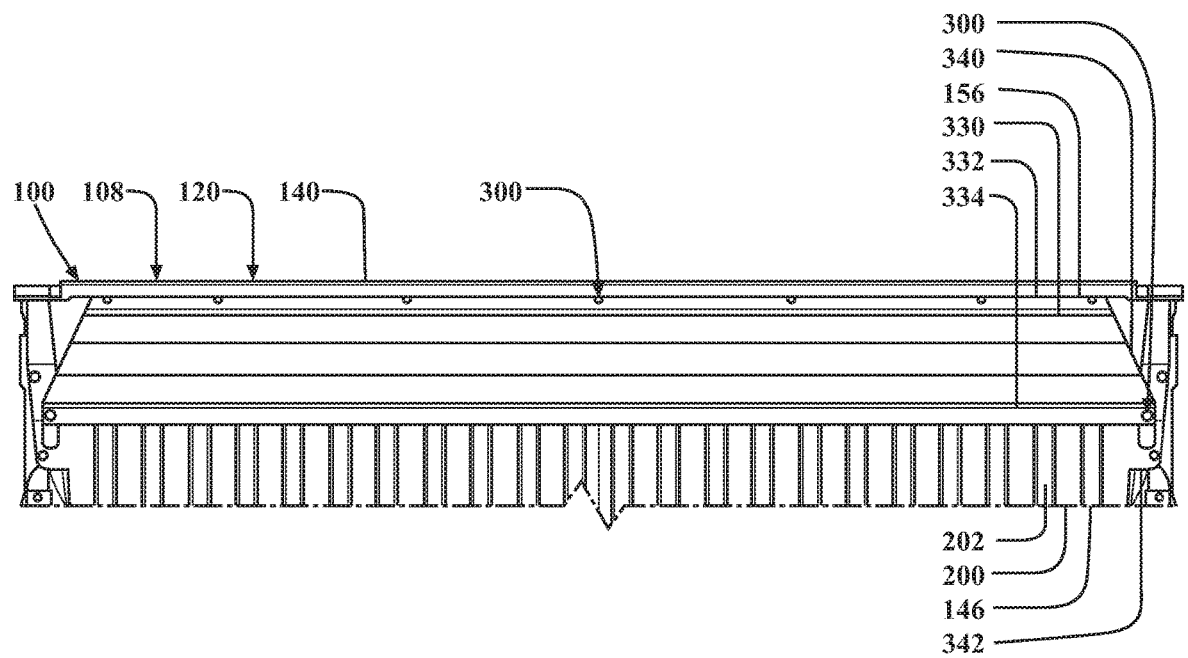
FIGS. 3A, 3B and 3C are front, rear and perspective views, respectively, of a fastener and adhesive-based structural arrangement for securing the reinforcement to the bed box, showing the reinforcement, the bulkhead panel and brackets of the bed box.
Figure 3B:
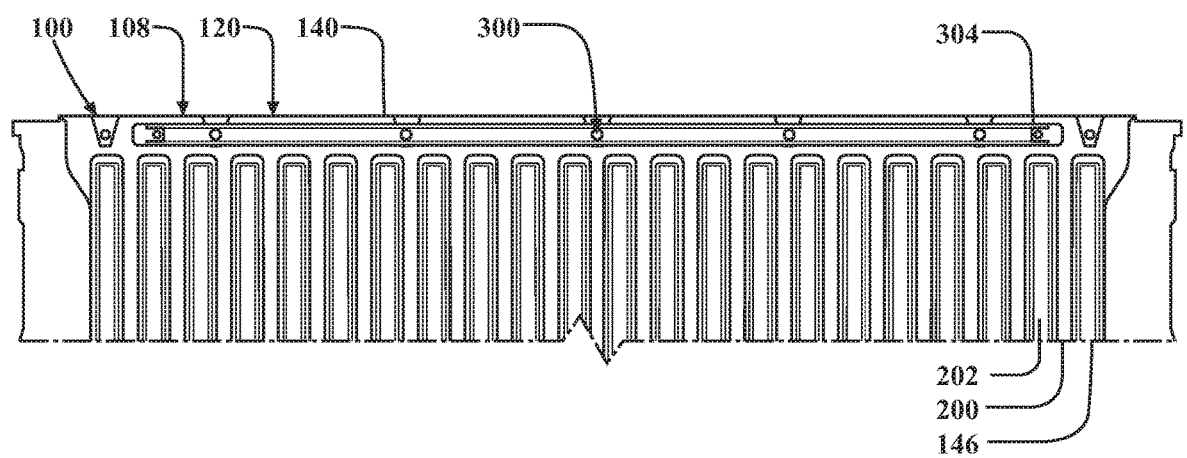
Figure 3C:
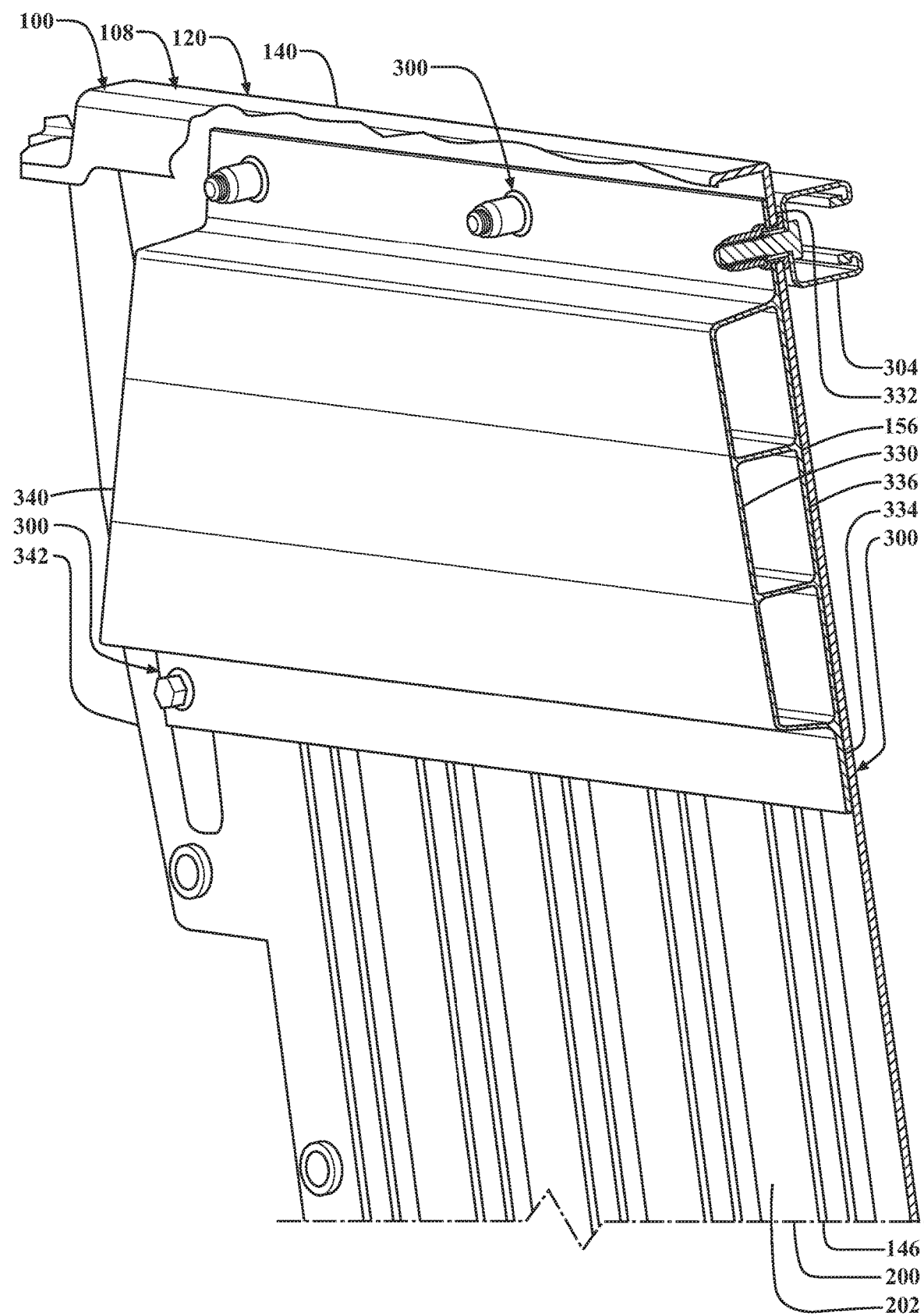

As shown with additional reference to FIGS. 3A, 3B and 3C, the vehicle 100, as part of the body 120, includes a structural arrangement 300 for securing the reinforcement 156 to the bed box 140 at the securement points. As shown, the structural arrangement 300 includes or is otherwise associated with the reinforcement 156 and the bed box 140, including the bulkhead panel 146. Moreover, as shown with additional reference to FIGS. 3D and 3E, as part of the bulkhead panel 146, the structural arrangement 300 includes a row of first rivet nuts 302 for securing the reinforcement 156 to the bulkhead panel 146. Relatedly, as part of the structural arrangement 300, the vehicle 100 includes an accessory rail 304 opposite the reinforcement 156 rear of and backed against the bulkhead panel 146, and first fasteners 306 respectively using the first rivet nuts 302 to secure the accessory rail 304 to the bulkhead panel 146. Moreover, as shown with additional reference to FIGS. 3F and 3G, the structural arrangement 300 includes a pair of second fasteners 310 for securing the reinforcement 156 to the bed box 140. Relatedly, as part of the bed box 140, the structural arrangement 300 includes a pair of second rivet nuts 312 for the second fasteners 310, and a pair of backings 314 for the second rivet nuts 312. As shown, with configurations typical of screws, bolts and the like, the first fasteners 306 include heads 320 and threaded shanks 322 projecting from the heads 320, and the second fasteners 310 include heads 324 and threaded shanks 326 projecting from the heads 324. Moreover, as shown with additional reference to FIGS. 3H and 3I, as part of the bulkhead 126, the structural arrangement 300 includes adhesive 328 for securing the reinforcement 156 to the bulkhead panel 146.

Among other aspects of the structural arrangement 300, with the first rivet nuts 302 securing the reinforcement 156 to the bulkhead panel 146, the first rivet nuts 302, although unconcealed, are disguised. Specifically, as opposed to structural arrangements with unsightly unconcealed fasteners, the first rivet nuts 302 give the impression of being enhancements for securing the accessory rail 304. Moreover, with the second fasteners 310 securing the reinforcement 156 to the bed box 140, the reinforcement 156 is secured to the bed box 140 from outside the bed box 140 without tightening the second fasteners 310 against the bed box 140. Beyond the second fasteners 310 being concealed, as opposed to structural arrangements in which fasteners are tightened against the bed box 140 to secure the reinforcement 156 thereto, the bed box 140 does not suffer the threat of becoming deformed by the second fasteners 310, and the structural arrangement 300 does not suffer the associated threat of becoming compromised. Moreover, with the adhesive 328 securing the reinforcement 156 to the bulkhead panel 146, and the adhesive 328 being hidden outside the bulkhead panel 146, unsightly unconcealed fasteners are avoided.

As noted above, the body elements besides the bed box 140 may have any combination of constructions, and may be made from one or more metallic materials. For instance, the first rivet nuts 302, the first fasteners 306, the second fasteners 310, the second rivet nuts 312 and the backings 314 may be made from one or more metals, such as steel or aluminum.

In relation to the structural arrangement 300, the reinforcement 156 is flat-backed. The reinforcement 156 includes a spine 330, and a flat upper edge 332 and a flat lower edge 334 opposed about the spine 330. Moreover, the reinforcement 156 includes a flat back 336. As shown, the spine 330, the upper edge 332 and the lower edge 334 share the back 336. Moreover, at the back 336, as part of the lower edge 334, the reinforcement 156 includes a wide, shallow channel 338. With the back 336 and the spine 330 being upright, the back 336 and the spine 330 are oriented with the reinforcement 156. The spine 330 projects from the back 336 normally thereto and, including the back 336, has a heightened multi-chamber cross-sectional shape. Similarly, with the upper edge 332 and the lower edge 334 being upright, the upper edge 332 and the lower edge 334, as well as the channel 338, are oriented with the reinforcement 156. The upper edge 332 and the lower edge 334 are strip-like, and extend from the spine 330 as continuous extensions of the back 336. As shown, the reinforcement 156 also includes end tapers 340 that, relative to the upper edge 332, laterally extend the lower edge 334.

As part of the structural arrangement 300, the bed box 140 includes two unitarily-formed brackets 342 for the second rivet nuts 312 oriented with the bulkhead panel 146. As part of the bulkhead 126, the body 120 includes the brackets 342 as outer body elements. The brackets 342 are upright, and laterally spaced apart from one another. The brackets 342 extend outside the bed box 140 inline with the bulkhead panel 146 vertically from above the deck panel 142 alongside approximately the uppermost ⅓ of the bulkhead panel 146, and laterally outside the junctions between the bulkhead panel 146 and the side panels 144.

The reinforcement 156 and the bulkhead panel 146 are mutually configured for backed engagement in which, with the reinforcement 156 backed against the bulkhead panel 146, the reinforcement 156 and the bulkhead panel 146 are engaged with one another. As shown, with the corrugations 202 being crosswise to the reinforcement 156, the back 336 backs against the bulkhead panel 146, with the back 336, including the upper edge 332 and the lower edge 334, and the corrugations 202 engaged with one another. Specifically, with the corrugations 202 being adjacent outside ridges and outside valleys, the back 336, including the upper edge 332 and the lower edge 334, and the outside ridges engage with one another, leaving spaces between the back 336 and the adjacent outside valleys. With the reinforcement 156 and the bulkhead panel 146 engaged with one another, space is left inside the channel 338 for installing the adhesive 328. As shown, the depth of the channel 338 establishes a thickness for the adhesive 328 to assume upon installation inside the channel 338. Similarly, the reinforcement 156 and the brackets 342 are mutually configured for backed engagement in which, with the reinforcement 156 backed against the brackets 342, the reinforcement 156 and the brackets 342 are engaged with one another. As shown, the back 336 backs against the brackets 342, with the back 336, including only the lower edge 334 extended by the end tapers 340, and the brackets 342 engaged with one another.

Figure 3D:
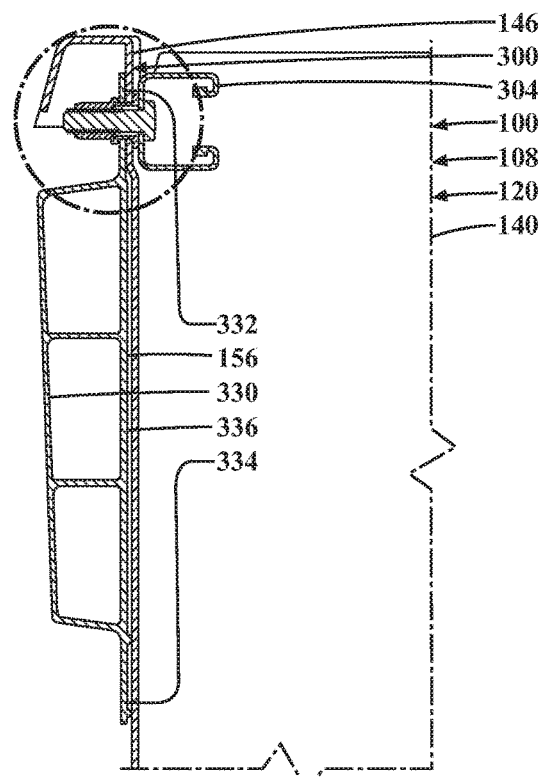

As shown with additional reference to FIGS. 3D and 3E for a representative first rivet nut 302 and first fastener 306, the first rivet nut 302 is oriented normally to the bulkhead panel 146. The first rivet nut 302 includes a threaded bore 350, and a rim flange 352 and a clinched side upset 354 along the threaded bore 350. With the first rivet nut 302 initially including the threaded bore 350 and the rim flange 352, the side upset 354 is added with its installation. As shown, the rim flange 352 and the side upset 354 are longitudinally spaced apart from one another along the threaded bore 350.

With the reinforcement 156 behind and backed against the bulkhead panel 146, and the first rivet nut 302 aside the bulkhead panel 146 and facing inside the bed box 140, the first rivet nut 302 is configured to install, trailing with the rim flange 352, to the bulkhead panel 146 against the reinforcement 156. As shown, the first rivet nut 302 installs against the upper edge 332. With its installation, the first rivet nut 302 is configured to extend from aside the bulkhead panel 146 to the reinforcement 156 through the bulkhead panel 146. From its position at the reinforcement 156, the first rivet nut 302 is configured to secure to the reinforcement 156, including clinching against the reinforcement 156. In association therewith, from its position aside the bulkhead panel 146, the first rivet nut 302 is configured to engage with the bulkhead panel 146. As shown, with the rim flange 352 aside the bulkhead panel 146, the threaded bore 350 extends through the bulkhead panel 146 and through the upper edge 332, and the side upset 354 is clinched against the upper edge 332. In association with the side upset 354 clinching against the upper edge 332, from its position aside the bulkhead panel 146, the rim flange 352 engages the bulkhead panel 146.

As shown, with its installation, the first rivet nut 302 secures the reinforcement 156 to the bulkhead panel 146 along the upper edge 332. With the first rivet nut 302 securing the reinforcement 156 to the bulkhead panel 146, the first rivet nut 302, although unconcealed, is disguised. Specifically, the first rivet nut 302 gives the impression of being an enhancement for securing the accessory rail 304.

With the accessory rail 304 backed against the bulkhead panel 146, the accessory rail 304 and the first rivet nut 302 are configured for engagement with one another. In alignment with the first rivet nut 302, the first fastener 306 is configured to install, leading with the threaded shank 322, from inside the bed box 140. With its installation, the first fastener 306 is configured to extend from aside the accessory rail 304 through the accessory rail 304 to the first rivet nut 302. As shown, with the head 320 aside the accessory rail 304, the threaded shank 322 extends to the first rivet nut 302 through the accessory rail 304, and is threaded with the first rivet nut 302. Specifically, the threaded shank 322 is threaded with the threaded bore 350. In association with the threaded shank 322 threading with the first rivet nut 302, from its position aside the accessory rail 304, the head 320 engages the accessory rail 304.

As shown, with its installation, the first fastener 306 secures the accessory rail 304 to the bulkhead panel 146 against the first rivet nut 302 at the rim flange 352. With the accessory rail 304 secured against the first rivet nut 302, the first fastener 306 secures the accessory rail 304 to the bulkhead panel 146 without tightening against the bulkhead panel 146. Accordingly, the bulkhead panel 146 does not suffer the threat of becoming deformed by the first fastener 306, and the structural arrangement 300 does not suffer the associated threat of becoming compromised.

Figure 3F:
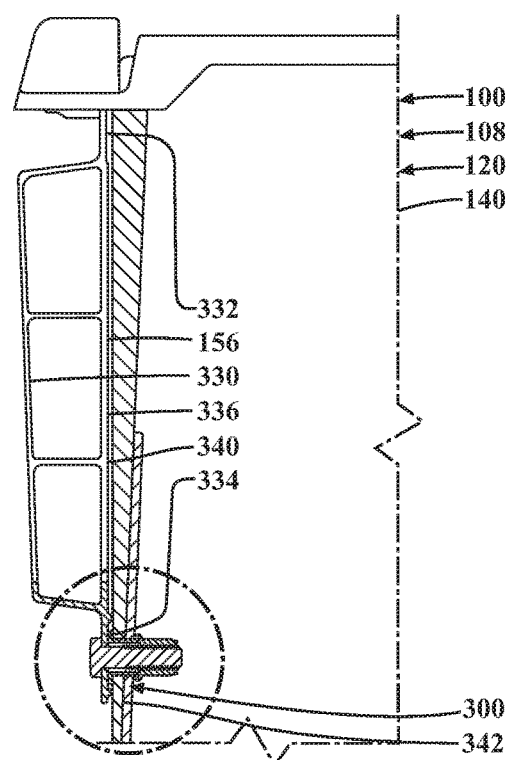

As shown with additional reference to FIGS. 3F and 3G for a representative bracket 342, second fastener 310, second rivet nut 312 and backing 314, the second rivet nut 312 is oriented normally to the bracket 342, and the backing 314 is oriented with the bracket 342. The second rivet nut 312 includes a threaded bore 360, and a rim flange 362 and a clinched side upset 364 along the threaded bore 360. With the second rivet nut 312 initially including the threaded bore 360 and the rim flange 362, the side upset 364 is added with its installation. As shown, the rim flange 362 and the side upset 364 are longitudinally spaced apart from one another along the threaded bore 360. As shown, the backing 314 is flat.

With the backing 314 behind and backed against the bracket 342, and the second rivet nut 312 aside the bracket 342 and facing outside the bed box 140, the second rivet nut 312 is configured to install, trailing with the rim flange 362, to the bracket 342 against the backing 314. With its installation, the second rivet nut 312 is configured to extend from aside the bracket 342 to the backing 314 through the bracket 342. From its position at the backing 314, the second rivet nut 312 is configured to secure to the backing 314, including clinching against the backing 314. In association therewith, from its position aside the bracket 342, the second rivet nut 312 is configured to engage with the bracket 342. Accordingly, with its installation, the second rivet nut 312 secures the backing 314 to the bracket 342. As shown, with the rim flange 362 aside the bracket 342, the threaded bore 360 extends through the bracket 342 and through the backing 314, and the side upset 364 is clinched against the backing 314. In association with the side upset 364 clinching against the backing 314, from its position aside the bracket 342, the rim flange 362 engages the bracket 342.

With the reinforcement 156 backed against the bracket 342, the reinforcement 156 and the second rivet nut 312 are configured for engagement with one another. As shown, the back 336 is backed against the rim flange 362, with the lower edge 334 and the rim flange 362 engaged with one another. In alignment with the second rivet nut 312, the second fastener 310 is configured to install, leading with the threaded shank 326, from outside the bed box 140. With its installation, the second fastener 310 is configured to extend from aside the reinforcement 156 through the reinforcement 156 to the second rivet nut 312. From its position at the second rivet nut 312, the second fastener 310 is configured to thread with the second rivet nut 312. In association therewith, from its position aside the reinforcement 156, the second fastener 310 is configured to engage with the reinforcement 156. As shown, with the head 324 aside the reinforcement 156, the threaded shank 326 extends to the second rivet nut 312 through the reinforcement 156, and is threaded with the second rivet nut 312. Specifically, the threaded shank 326 extends through the lower edge 334, and is threaded with the threaded bore 360. In association with the threaded shank 326 threading with the second rivet nut 312, from its position aside the reinforcement 156, the head 324 engages the reinforcement 156. Specifically, the head 324 engages the lower edge 334.

As shown, with its installation, the second fastener 310 secures the reinforcement 156 to the bracket 342 at an end of the lower edge 334 extended by the end taper 340 against the second rivet nut 312 at the rim flange 362. Beyond the second fastener 310 being concealed, with the reinforcement 156 secured against the second rivet nut 312, the second fastener 310 secures the reinforcement 156 to the bracket 342 without tightening against the bracket 342. Accordingly, the bracket 342 does not suffer the threat of becoming deformed by the second fastener 310, and the structural arrangement 300 does not suffer the associated threat of becoming compromised.

Figure 3H:
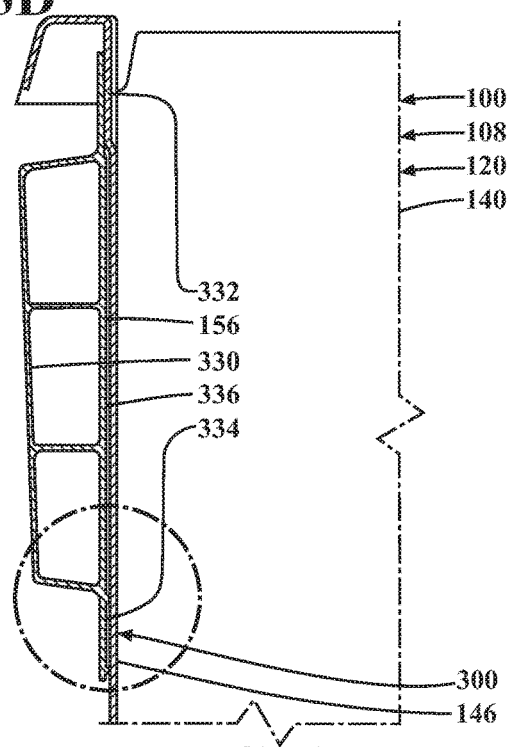

As shown with additional reference to FIGS. 3H and 3I, with the reinforcement 156 backed against the bulkhead panel 146, the adhesive 328 is configured to install inside the channel 338 from outside the bed box 140. From its position inside the channel 338, the adhesive 328 bonds between the reinforcement 156 and the bulkhead panel 146. With the adhesive 328 assuming the thickness established by the depth of the channel 338, the adhesive 328 has an ensured bonding strength between the reinforcement 156 and the bulkhead panel 146. As shown, with its installation, the adhesive 328 secures the reinforcement 156 to the bulkhead panel 146 along the lower edge 334. With the adhesive 328 securing the reinforcement 156 to the bulkhead panel 146, and the adhesive 328 being hidden outside the bulkhead panel 146, unsightly unconcealed fasteners are avoided.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicular body structural arrangement, comprising:
a unitarily-formed polymeric bed box, the bed box including a bulkhead panel;
an elongate reinforcement backed against the bulkhead panel from outside the bed box, the reinforcement including a spine, and secured to the bed box in part in an unconcealed manner and in part from outside the bed box; and
a row of rivet nuts installed to the bulkhead panel against the reinforcement facing inside the bed box, the rivet nuts including threaded bores extending through the bulkhead panel and through the reinforcement, and engaged with the bulkhead panel and clinched against the reinforcement along the threaded bores, thereby securing the reinforcement to the bulkhead panel in an unconcealed manner.

2. The vehicular body structural arrangement of claim 1, wherein the reinforcement is metallic and has an extruded construction.

3. The vehicular body structural arrangement of claim 1, further comprising:
an accessory rail backed against the bulkhead panel from inside the bed box, and fasteners respectively extending through the accessory rail to the rivet nuts, the fasteners engaged with the accessory rail, and threaded with the threaded bores of the rivet nuts, thereby securing the accessory rail to the bulkhead panel.

4. The vehicular body structural arrangement of claim 1, further comprising:
the bed box including an outside bracket inline with the bulkhead panel; and
a rivet nut installed to the bracket against a backing facing outside the bed box, and a fastener extending through the reinforcement to the rivet nut, the fastener engaged with the reinforcement, and threaded with the rivet nut, thereby securing the reinforcement to the bracket at an end thereof from outside the bed box.

5. The vehicular body structural arrangement of claim 4, wherein the reinforcement is metallic and has an extruded construction.

6. The vehicular body structural arrangement of claim 1, further comprising:
the reinforcement including a channel facing the bulkhead panel; and
adhesive bonded between the reinforcement and the bulkhead panel inside the channel, thereby securing the reinforcement to the bulkhead panel from outside the bed box.

7. The vehicular body structural arrangement of claim 1, wherein the reinforcement extends across approximately an uppermost ⅓ of the bulkhead panel.

8. The vehicular body structural arrangement of claim 1, wherein the spine has a heightened multi-chamber cross-sectional shape.

9. A vehicular body structural arrangement, comprising:
a unitarily-formed polymeric bed box, the bed box including a bulkhead panel and an outside bracket inline with the bulkhead panel;
an elongate reinforcement backed against the bulkhead panel and the bracket from outside the bed box, the reinforcement including a spine and a channel facing the bulkhead panel;
a rivet nut installed to the bracket against a backing facing outside the bed box, and a fastener extending through the reinforcement to the rivet nut, the fastener engaged with the reinforcement, and threaded with the rivet nut, thereby securing the reinforcement to the bracket at an end thereof from outside the bed box; and
adhesive bonded between the reinforcement and the bulkhead panel inside the channel, thereby securing the reinforcement to the bulkhead panel from outside the bed box.

10. The vehicular body structural arrangement of claim 9, wherein the reinforcement, the rivet nut and the backing are metallic.

11. The vehicular body structural arrangement of claim 9, further comprising:
a row of rivet nuts installed to the bulkhead panel against the reinforcement facing inside the bed box, thereby securing the reinforcement to the bulkhead panel.

12. The vehicular body structural arrangement of claim 11, wherein the reinforcement is metallic and has an extruded construction.

13. The vehicular body structural arrangement of claim 11, further comprising:
an accessory rail backed against the bulkhead panel from inside the bed box, and fasteners respectively extending through the accessory rail to the rivet nuts installed to the bulkhead panel, the fasteners engaged with the accessory rail, and threaded with the rivet nuts, thereby securing the accessory rail to the bulkhead panel.

14. The vehicular body structural arrangement of claim 9, wherein the reinforcement extends across approximately an uppermost ⅓ of the bulkhead panel.

15. The vehicular body structural arrangement of claim 9, wherein the spine has a heightened multi-chamber cross-sectional shape.

16. A vehicular body structural arrangement, comprising:
a unitarily-formed polymeric bed box, the bed box including a deck panel, side panels, a bulkhead panel and outside brackets inline with the bulkhead panel;
an elongate metallic reinforcement having an extruded construction backed against the bulkhead panel and the brackets from outside the bed box, the reinforcement including a spine, and an upper edge and a lower edge opposed about the spine, the upper edge and the lower edge engaged with the bulkhead panel, and the lower edge including a channel facing the bulkhead panel;
a row of first rivet nuts installed to the bulkhead panel against the upper edge facing inside the bed box, thereby securing the reinforcement to the bulkhead panel along the upper edge;
an accessory rail backed against the bulkhead panel from inside the bed box, and first fasteners respectively extending through the accessory rail to the first rivet nuts, the first fasteners engaged with the accessory rail, and threaded with the first rivet nuts, thereby securing the accessory rail to the bulkhead panel;
second rivet nuts installed to the brackets against backings facing outside the bed box, and second fasteners respectively extending through the lower edge to the second rivet nuts, the second fasteners engaged with the lower edge, and threaded with the second rivet nuts, thereby securing the reinforcement to the bracket at ends of the lower edge from outside the bed box; and
adhesive bonded between the lower edge and the bulkhead panel inside the channel, thereby securing the reinforcement to the bulkhead panel along the lower edge from outside the bed box.

17. The vehicular body structural arrangement of claim 16, wherein the first rivet nuts, the first fasteners, the second rivet nuts, the backings and the second fasteners are metallic.

18. The vehicular body structural arrangement of claim 16, wherein the reinforcement extends across approximately an uppermost ⅓ of the bulkhead panel.

19. The vehicular body structural arrangement of claim 16, wherein the spine includes a flat back shared with the upper edge and the lower edge, with the upper edge and the lower edge extending from the spine as continuous flat extensions of the back.

20. The vehicular body structural arrangement of claim 16, wherein the spine has a heightened multi-chamber cross-sectional shape, and includes a flat back shared with the upper edge and the lower edge, with the upper edge and the lower edge extending from the spine as continuous flat extensions of the back.

\* \* \* \* \*